United States Patent [19]
Shubin et al.

[11] 3,885,475
[45] May 27, 1975

[54] PROGRAM CONTROL APPARATUS

[76] Inventors: Vladimir Nikolaevich Shubin, Pervomaiskaya ulitsa 1, kv. 103; Samuil Moiseevich Polyak, Tankovy Proezd, 1, kv. 55; Viktor Sergeevich Silantiev, Kastanaevskaya ulitsa, 57, korpus 1, kv. 58, all of Moscow, U.S.S.R.

[22] Filed: Dec. 10, 1973

[21] Appl. No.: 423,531

[52] U.S. Cl. ........ 74/568 R; 74/568 M; 200/38 CA; 200/153 LB
[51] Int. Cl. ............................................ F16h 53/08
[58] Field of Search ........ 74/568 T, 568 M, 568 FS, 74/568 R; 137/624.15, 624.16, 624.17; 200/38 BA, 38 CA, 153 LB

[56] References Cited
UNITED STATES PATENTS
2,860,524  11/1958  Allen ............................. 74/568 T X
3,506,032  4/1970  Eveleigh et al. .................. 74/568 R

*Primary Examiner*—Samuel Scott
*Assistant Examiner*—F. D. Shoemaker

[57] ABSTRACT

Program control device, e.g. for a tube bending machine, the device comprising a program carrier in the form of a flexible cam-carrying band tensioned about the cylindrical periphery of a program disc rotatable by the drive of the machine, a command device mounted on the framework of the machine and including followers engaging respective cams during rotation of the disc and thus controlling the operation of corresponding operative members of the machine. The cams are arranged on the band in individual transversal arrays that are adjustable peripherally of the program disc, that is along the band.

Each array includes a plurality of coaxial cams that are retained, in accordance with a preset control program, in locations underneath respective followers of the command device, the cam arrays being consequently adjustable along the band (peripherally of the disc) while the individual cams are independently adjustable in each array across the width of the band. The disclosed device offers simplified and fast assembling of an operational program of the tube bending machine and the like and provides for limitless correction of this program during the operation of the machine.

3 Claims, 2 Drawing Figures

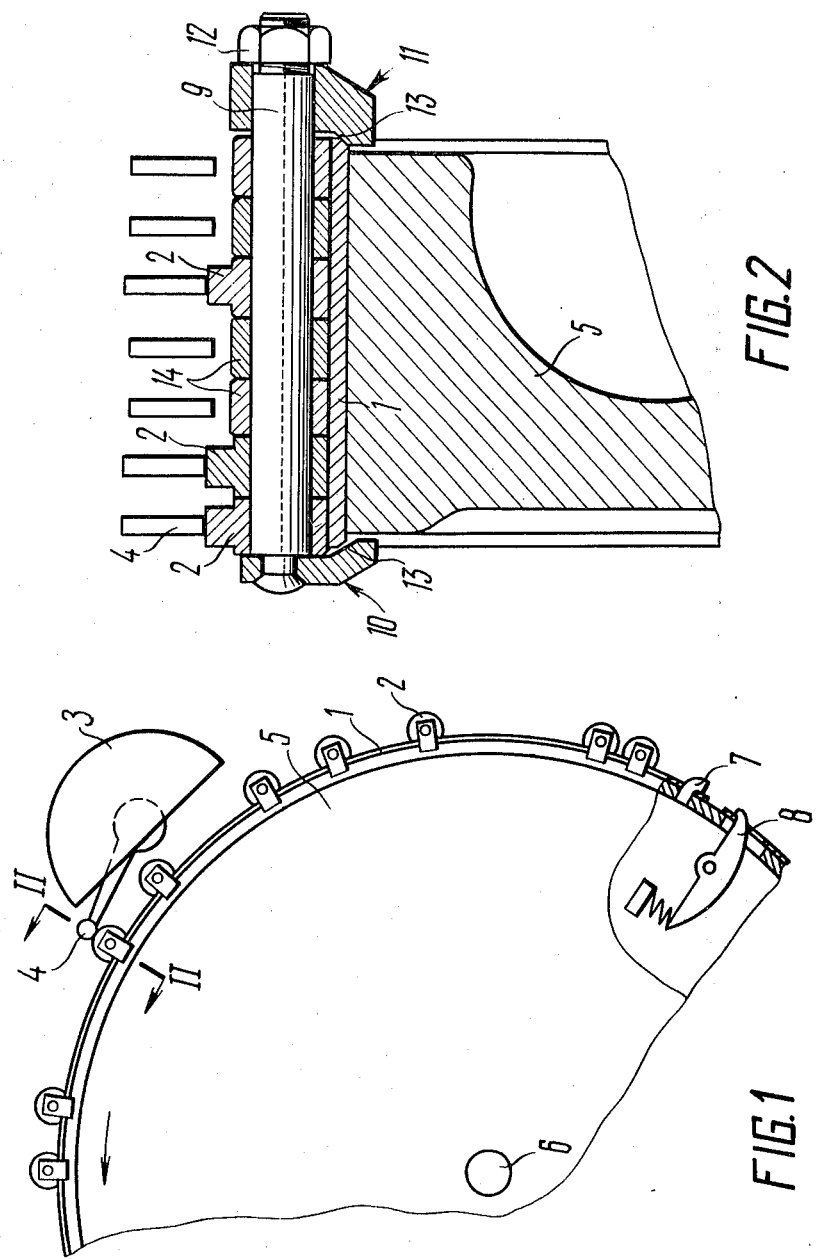

PROGRAM CONTROL APPARATUS

The present invention relates to working of metals by application of pressure, and, more particularly, it relates to a program control device or apparatus incorporable, for example, in machines performing a three-dimensional bending of tubes.

The present invention may be employed to utmost advantage in tube bending machines operating on the principle of pushing tubes into a bending head of the machine; however, the invention may be advantageously made use of in various other machines for the pressure-working of metals, such as rolled stock bending machines and, in general, in any machine or apparatus where the specific conditions of operation make it virtually impossible to pre-calculate a control program accurately enough in advance, thus necessitating correction of this program during the operation of the machine or apparatus.

Known in the art are devices for the digital program control of tube bending machines operating on the principle of winding tubes about mandrels and rolling them outwardly, wherein the program carrier includes either a magnetic or a perforated tape having an inflexible, i.e. unadjustable program recorded thereon.

In these program carriers the program is not readily visually recognisable, which complicates the tuning or adjustment of the program control apparatus and complicates even more any correction of the program during the operation of the machine.

The above difficulties become far more pronounced when tubes are bent by the advanced technique of pushing the tubes into the bending head of the machine, which technique enables to perform bending of tubes to complicated configurations, e.g. spiral bends and variable-radius bends.

In tube bending machines employing this last-mentioned technique, the accurate pre-calculation of a program is virtually impossible, which means that the program is to be improved by being manually corrected, which is complicated and affects the accuracy of the performance.

Furthermore, program control apparatus, wherein a program is inflexibly recorded, more often than not includes relatively complex electronic systems for reading and processing the program, such systems being costly and requiring correspondingly qualified labour.

On the other hand, there are already known program control apparatus for tube bending machines with a flexibly recorded program. Thus, the authors of the present invention have already disclosed a program control apparatus for tube bending machines operating on the tube pushing principle.

Corresponding applications were filed in a number of countries and patents have been granted.

In this last-mentioned apparatus the program carrier is in the form of a replaceable disc with cams, rotatable from the drive of the machine, the cams being mounted on the face of the disc in annular grooves along which the cams are adjustable, affording correction of the program.

Such cam-carrying discs render the program readily visually recognisable for the purpose of tuning and correction, whereas the arrangement of the cams in the annular grooves provides for continuous, i.e. stepless adjustment of the cams, which means that the program may be corrected with a great accuracy.

However, the bulkiness of these discs and the arising storage problems makes the employment of such discs impractical.

There are disclosed in other previously granted patents program control devices for tube bending machines, which are free from the above disadvantages.

In these known devices the program carrier includes a flexible band having rows of apertures extending longitudinally thereof, the apertures being adapted to receive therein contact members in the form of either cams or abutments, arranged according to the program to be performed, and forming corresponding rows.

The band is tensioned along the framework of the machine about a pair of drums, while the command device is mounted on the carriage of the machine.

As the carriage is reciprocated in operation of the machine, followers of the command device successively engage the cams in the respective rows, in which manner the program is read and commands are sent to the corresponding work-performing members of the machine.

In the last-mentioned known device the program may be corrected in a stepwise fashion, i.e. by re-positioning the cams from one aperture into another, which affects the accuracy of assembling or tuning of the program and practically prevents correction of the program in the operation of the machine.

Among the disadvantages of these known devices that includes flexible bands is also the fact that the range of their application is limited to machines wherein the stroke of the carriage corresponds to the length of the tube blank, since such devices cannot be incorporated in apparatus where a tube is fed into the machine by several reciprocal movements of the carriage, as well as in machines where there is no carriage altogether, and the tube is fed continuously, e.g. by feed-in rollers.

Furthermore, with the command device being mounted on the carriage of the machine, the accuracy and reliability of its performance are affected. For instance, bending of a tube may result in vibration of the carriage, this vibration impeding the operation of the command device.

It should be also born in mind that the rigid connection of the assemblies of the known program control apparatus with the assemblies of the machine, as well as the dependence of the size of this apparatus on the length of a tube blank, would not make it possible to arrange the program control apparatus as an autonomous unit; neither will it make possible to adjust or change the scale of the program carrier, which affects the versatility of the apparatus, as a whole, and results in a relative bulkiness of the assemblies of both the machine and the program control apparatus for the tube bending machine.

Besides, tensioning of the flexible cam-carrying band along the framework of the machine, by means of two spools mounted at opposite ends of this framework, calls for relatively great tensioning efforts, which means that the dimensions of the band are to be increased to afford these efforts.

It is an object of the present invention to provide a program control apparatus for a tube bending machine, which provides rapidity of the program assembling or tuning operation and continuous adjustability of the program during the operation of the machine.

This and other objects are attained in a program control device or apparatus for a tube bending machine which device comprises a program carrier including a flexible band having rows or arrays of cams extending tangentially thereon, the discrete cams being arranged for successive interaction in peripheral rows with respective followers of a command device for controlling the operation of the work-performing members of the machine. In accordance with the present invention, the command device of the apparatus is rigidly and non-movably mounted on the framework of the machine, while the band with the cams thereon is tensioned about the cylindrical periphery of a disc rotatable by the drive of the machine. The cams are mounted on the band in the individual transversal arrays including each a plurality of these cams mounted coaxially, with provision for adjustment of each array longitudinally of the band, the cams in each array being arranged in corresponding peripheral rows of the band in accordance with a preset program, with provision for adjustment of these cams transversely of the band.

With the cams being arranged on the band in the herein disclosed manner, the assembling of tuning of the program becomes considerably simplified and sped up, and the program itself becomes infinitely adjustable during the operation of the machine.

To provide for adjustment of each cam along an axis or spindle thereof, it is advisable that the cams are freely received about their axes and retained in a desired position relative to the respective one of the followers of the command device by means of spacer rings received about the same axes.

With the cams being mounted in this manner, they can be easily re-positioned from one peripheral row into another, which cuts the program tuning time.

It is further advisable that each axis or spindle with the cam thereon is mounted on the band by means of a pair of jaws received on opposite edges of this band, the axes being adjustable longitudinally of the band by one of the two jaws being rigidly secured to the axis or spindle and the other jaw being freely received about the spindle and pressed by a threaded nut to the respective edge of the band.

With each array of the cams being mounted on the band in the abovedescribed easily detachable manner, the preparation and tuning of a program and its correction during the operation of the machine become considerably simplified and sped up.

The present invention will be further illustrated by a detailed description of an exemplary embodiment thereof, reference being made to the accompanying drawings, wherein:

FIG. 1 is a schematic, partly broken-away front view of a program control apparatus for a tube bending machine, constructed in accordance with the invention; and FIG. 2 is a sectional view along line II—II in FIG. 1.

Referring now in particular to the appended drawings, the inventive program control apparatus for a tube bending machine includes a program carrier in the form of a flexible band 1 (FIGS. 1 and 2) carrying a plurality of cams 2, and a command device including followers 4, each of the followers controlling the operation of a corresponding work-performing member of the tube bending machine (not shown).

In accordance with the invention, the command device is rigidly fixed on a framework of the machine, while the flexible band 1 with the cams 2 thereon is tensioned about the cylindrical periphery of a program disc 5 secured on a shaft 6 operatively connected with a drive of the machine (not shown).

One end of the flexible band 1 is secured to the periphery of the disc 5 by means of a fixed retainer lug 7, while the opposite end of the band has therein an aperture adapted to receive therein a spring-urged catch 8 tensioning the flexible band 1 about the periphery of the disc 5.

In accordance with the invention, the cams are arranged on the flexible band 1 in individual, tangential or transversal arrays, each array including a plurality of coaxially arranged cams 2.

Each such array of the cams 2 is attached to the band 1 by means of an easily detachable connection, providing for adjustment of each array longitudinally of the band 1, that is peripherally of the disc 5.

In accordance with a further feature of the present invention, each detachable connection includes an axis or spindle 9 extending across the entire width of the band 1 and a pair of jaws 10 and 11. The jaw 10 is secured to one end of the spindle 9, whereas the other jaw 11 is freely received about the other end of the spindle 1 and is secured, for example, with a nut 12 that can be threaded onto the end of its spindle.

The internal face of each jaw 10 and 11 is provided with an inclined lug 13 adapted to engage the respective edge of the band 1, as the spindle 9 with the cams 2 thereon is fixed on the band 1.

Intermediate of the two jaws 10 and 11, each spindle 9 freely receives thereabout a predetermined number of the cams 2 in the array, and a plurality of spacer rings 14 positioning the cams 2, in accordance with the preset program, within the respective arrays that extend in longitudinal rows about the band 1, in accordance with the positioning of the followers 4 of the command device 3.

The inclined lugs 13 provided on the jaws 10 and 11 ensure that the cams are pressed against the surface of the band 1 and that the latter with the cams 2 thereon, is retained on the respective face (periphery) of the disc 5.

The configuration of a tube bent by the associated machine is defined by the arrangement of the cams 2 on the band 1 and by the spacing of the cams, in which way a desired and pre-calculated tube bending program is expressed in a corresponding preset arrangement of the cams on the band 1.

In other words, preparing or tuning of the preset program is effected by arranging a corresponding set of the cams 2 about each one of the spindles 9 and positioning the spacer rings 14 about the same spindles to retain the cams 2 thereon within the required transversal arrays, thereby constituting the earlier-mentioned longitudinal rows, whereafter the spindles 9 with the cam arrays thereon are secured on the band 1 by means of the jaws 10 and 11 and the nut 12, as it has been described hereinabove, at a proper spacing therebetween, to correspond to the preset program, a commonly known caliper being used for the purpose.

The herein disclosed program control apparatus for a tube bending machine operates as follows. By depressing a corresponding push-button on the control panel (not shown) of the associated machine, the program disc 5, with the band 1 and the cams 2 thereon, is rotated by the drive of the machine, in the course of which rotation the cams 2 of each longitudinal row successively engage the respective follower 4 of the command device 3, associated with and resulting in a corresponding motion of the tube bending machine that is being controlled.

Thus, for instance:

the 1-st row of the cams 2 (from the left to the right in FIG. 2) may control the stroke of a bending roller of the machine in one direction;

the 2-nd row controls the stroke of the bending roller in the opposite (reverse) direction;

the 3-d row rotation of the tube being bent in one direction;

the 4-th row rotation of the tube in the opposite direction;

the 5-th row controls a first speed of pushing of the tube into a bending head of the machine;

the 6-th row controls a second tube pushing speed;

the 7-th row of the cams 2 varies the angular speed of rotation of the program disc 5, varying in this manner the time-related scale of this program.

Since an accurate pre-calculation of a program for a tube bending machine, operating on the principle of pushing a tube through the bending head, is practically impossible, the preset program is to be corrected in the operation of the machine, i.e. during rotation of the program disc 5, which is rotated at a permanent speed, in synchronism with the motions of the machine preferably, the rotation of the disc is stopped for a short while to perform the operations that will now be described.

Any correction of the program during the rotation of the disc 5 is limited to varying the peripheral spacing between the spindles 9 of the quickly detachable connections, carrying the cam arrays, which is performed by releasing the nuts 12 and from their spindles displacing the latter, once loosened, longitudinally of the band 1 to their required positions together with the cam arrays (about the perimeter of the disc 5).

This possibility of infinite or stepless adjustment of the spindles 9 with the cams 2 longitudinally of the band 1 provides for accurate infinite correction of the program in operation of the machine.

A program control device for a tube bending machine, constructed in accordance with the present invention, combines the advantages of two principally different systems, viz. simplicity of structure, easy visual appreciation of the program and facilitated correction of the latter, which are the advantages offered by the existing cam-type control systems, and versatility, compact size and facilitated storage of the program carriers, which are the advantages of digital control systems.

Furthermore, the arrangement of the cams across the width of the band in individual arrays provides for possible pre-classification or set-up of these cams by separate pre-assembly units corresponding to various combinations of the cams, which are usually included in the majority of programs.

Such pre-assemblies of the cams may be stored in an appropriate place, so that when the need arises any required program may be readily assembled or tuned from these pre-assemblies, by the mere arrangement of these pre-assemblies on the band in an order corresponding to the required program.

It is quite clear from the abovesaid that a program control apparatus or device in accordance with the present invention is truly versatile and may be incorporated in any tube bending machine, independently of the design of the machine, its bending principle and its size.

What is claimed is:

1. A program control device for a tube bending machine and the like, wherein the machine has a framework, operative members, and a drive; the device comprising: a command device mounted on said framework and including stationary followers controlling the operation of corresponding ones of said members; a disc rotatable by said drive; a program carrier in the form of a flexible band tensioned about the cylindrical periphery of said disc and secured thereto, including successive peripheral sections of said band; cams arranged on said band in transversal arrays that are substantially parallel to the axis of said disc, for successive engagement of each cam, in respective peripheral rows about said band, by a respective one of said followers during the rotation of said disc; said transversal cam arrays being removably and slidably mounted on said band, each array including a number of said cams coaxially received about a common spindle which extends across said band; said cams being disposed on said spindles in accordance with a preset program within corresponding ones of said peripheral rows; said followers being mounted at predetermined locations above said corresponding peripheral cam rows, to provide for the preset program and the modification of that program during the operation of the machine; and means for positioning said cams within said arrays across said band at any one of said locations, and also for positioning said transversal cam arrays in a stepless manner at any one of said peripheral band sections, thereby to provide the preset program.

2. The device as defined in claim 1, wherein said positioning means for said cams includes spacer rings disposed about said spindles in adjacent relationship to at least some of said cams in each of said arrays.

3. The device as defined in claim 1, wherein said positioning means for said cam arrays includes a pair of jaws for each array, engaging respective edges of said band, one of said jaws being rigidly connected with said spindles, and the other jaw being loosely received about said spindles and pressed to a respective edge of said band with threaded nuts engaging the ends of said spindles.

* * * * *